No. 877,307. PATENTED JAN. 21, 1908.
W. C. DUNN.
AIR SHIP.
APPLICATION FILED NOV. 12, 1906.

2 SHEETS—SHEET 1.

Witnesses:
Al. M. Carthy.
R. C. Braddock.

Inventor:
William C. Dunn.
By William W. Deane
his Att'y.

UNITED STATES PATENT OFFICE.

WILLIAM C. DUNN, OF KANSAS CITY, MISSOURI.

AIR-SHIP.

No. 877,307.

Specification of Letters Patent.

Patented Jan. 21, 1908.

Application filed November 12, 1906. Serial No. 342,990.

*To all whom it may concern:*

Be it known that I, WILLIAM C. DUNN, a citizen of the United States, residing at Kansas City, in the county of Jackson and State of Missouri, have invented certain new and useful Improvements in Air-Ships, of which the following is a specification.

My invention has relation to air ships; and it contemplates the provision of an air ship embodying a gas bag or holder, and a shaft having one or more propellers and arranged in such manner, relative to the gas bag or holder, that the navigable efficiency of the air ship as a whole is considerably increased.

The invention also contemplates the provision of an air ship in which the shaft bearing the propellers is utilized in the connection of the car to the gas bag or holder, this being materially advantageous since it conduces to the compactness and strength of the ship as a whole and renders the same well adapted to withstand the usage and conditions to which air ships are ordinarily subjected.

The invention further seeks the provision in an air ship, balloon or the like, of a gas bag or holder having at its forward end or side an air chamber calculated to form a cushion which will take up the pressure or impact of the wind or air currents and hence will effectually prevent the same from exploding the gas bag or holder.

Figure 1:
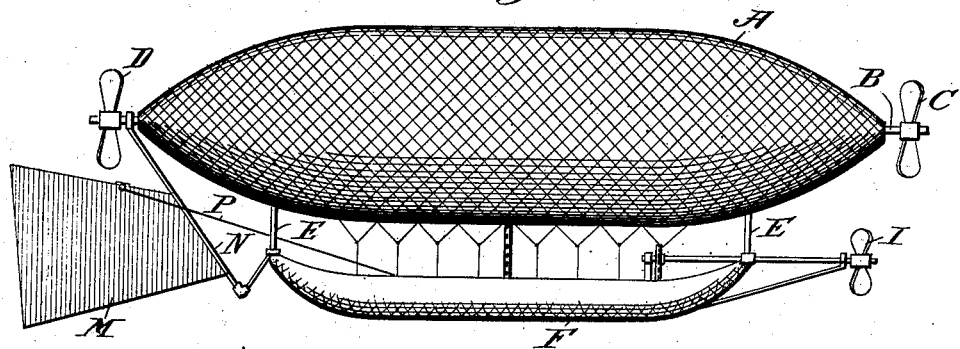
Figure 2:
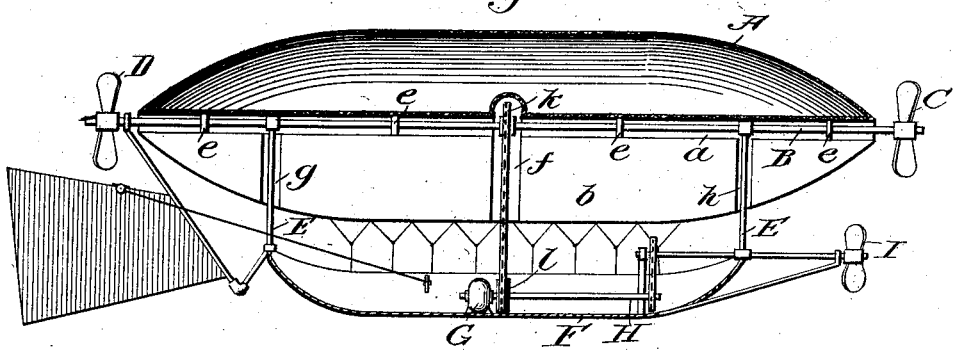
Figure 3:
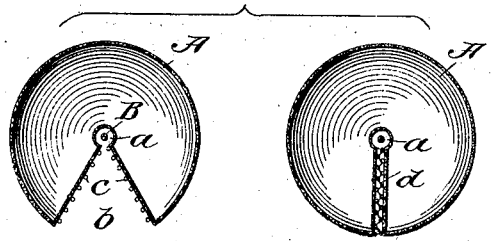
Figure 4:
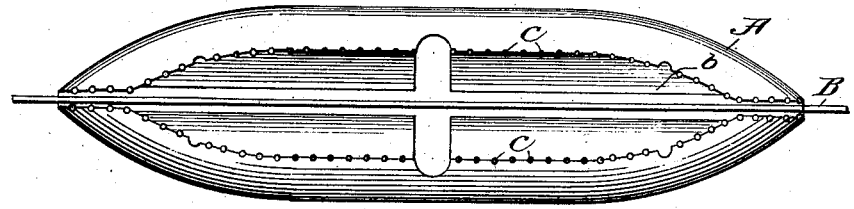
Figure 5:
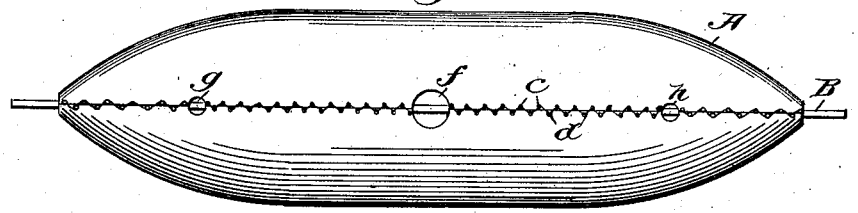
Figure 6:
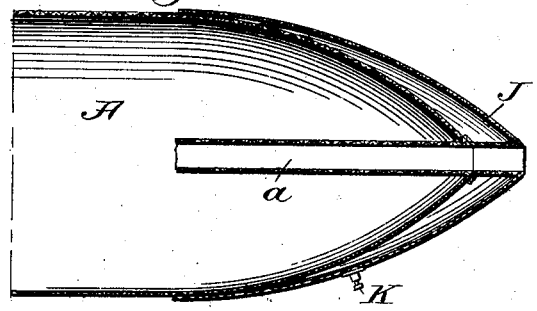
Figure 7:
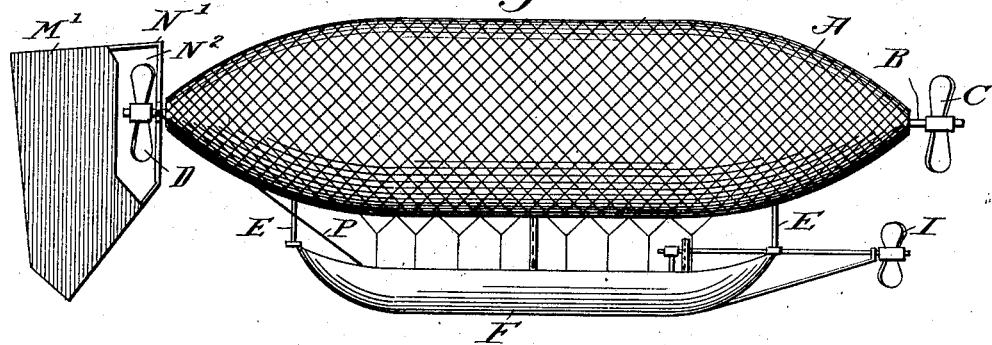

Various other advantageous features peculiar to my invention will be fully understood from the following description and claims when the same are read in connection with the accompanying drawings, forming part of this specification, in which:

Figure 1 is a side elevation of the air ship constituting the present and preferred embodiment of my invention, as the same appears when in flight. Fig. 2 is a longitudinal vertical section of the air ship. Fig. 3 is a transverse section taken in a plane slightly in rear of the driving connection intermediate the motor in the car and the propeller shaft in the longitudinal center of the gas bag or holder. Fig. 4 is an inverted plan view of the gas bag or holder as the same appears when opened to permit of the shaft bearings being adjusted and the car hangers and the driving connection being connected to the propeller shaft. Fig. 5 is a similar view illustrating the gas bag or holder as closed. Fig. 6 is an enlarged detail section of the forward end of the gas bag or holder, illustrating the protective air chamber thereof. Fig. 7 is a view similar to Fig. 1 illustrating a modified arrangement of the rudder of the air ship relative to the gas bag or holder and the car.

Referring by letter to the said drawings and more particularly to Figs. 1 to 6 thereof: A is the gas bag or holder of the air ship. The said gas bag or holder is preferably of the general shape illustrated, though it may be of any other shape compatible with my invention without involving departure from the scope thereof. It is peculiar in that it has a longitudinal central passage $a$ extending from one of its ends to the other isolated from its gas-containing interior, and also in that it has a longitudinal opening $b$ at its underside in communication with the longitudinal central passage $a$. The walls of the said opening $b$ are equipped with hooks $c$ or analogous appurtenances for the engagement of a lacing cord $d$, and hence it will be apparent that subsequent to the adjustment of the shaft, presently described, and the parts connected therewith, the opening $d$ may be closed as shown in Fig. 5.

B is the propeller shaft of the air ship. This shaft B is journaled in suitable bearings $e$ disposed in the passage $a$ of the gas bag or holder, and extends beyond the ends of said gas bag or holder about the proportional distances illustrated. It is equipped at its forward end with a propeller C and at its rear end with a propeller D; the blades of the propeller C being arranged when the shaft B is rotated in one direction to draw the gas bag or holder, and the blades of the propeller D being arranged when shaft B is rotated in said direction to push the gas bag or holder.

Loosely connected to the propeller shaft B and extending from the same and through the opening $b$ in the gas bag or holder A are tubes $f$, $g$ and $h$. The tubes $g$ and $h$ are designed for the passage of the hangers E through the medium of which the car F of the air ship is connected with the shaft B, while the tube $f$ is for the passage of the driving connection intermediate the motor G in the car F and the propeller shaft B. The said motor G is arranged approximately in the middle of the car F, and its shaft H is carried to the forward end of the car F where it is connected with the shaft of a propeller I, arranged to assist the propeller C in drawing the ship through the air. The driving connection intermediate the shaft H of the motor G and the propeller shaft B may be of any description adapted to the purpose without affecting my invention, though I prefer to have it comprise a sprocket gear k on the shaft B, a sprocket gear l on the motor shaft H, and a suitable connecting belt.

With a view of rendering the gas bag or holder A less liable to explode when it encounters a strong air current, I prefer to provide the said bag or holder at its forward end with an air chamber J, best shown in Fig. 6. This chamber J is provided with a valved inflation tube K, and hence it may be inflated incident to the charging of the interior of the bag or holder A with gas, or subsequent to such operation in the discretion of the operator of the air ship.

M is the rudder of the air ship. This rudder is connected in a pivotal manner to a frame N carried by the propeller shaft B and the car F, as shown in Figs. 1 & 2, and from its opposite sides cables P extend to the car so as to enable the operator in the car to readily position it according to the course he desires to take.

It will be gathered from the foregoing that the disposition of the propeller shaft B of the air ship in the gas bag or holder A, and the suspension of the car F from said propeller shaft B contributes in a material degree to the stiffness and strength of the air ship and renders the same compact and graceful in appearance; also, that said arrangement conduces to the facility with which the air ship may be handled or navigated, and at the same time lessens the liability of accident, this latter because lateral swaying of the car F is practically eliminated.

In lieu of the rudder M illustrated in Figs. 1 and 2 I may employ the rudder M¹ shown in Fig. 7 or any other rudder suitable to my type of air ship. The rudder M¹ is pivoted to a frame N¹ mounted immediately in front of the rear propeller on the shaft B, and is provided with an opening N² to receive the said rear propeller. It is also provided at its opposite sides with cables P; and these latter extend to a point within the car F so as to enable the operator in the car to conveniently steer the ship while the same is in motion through the air.

The construction herein illustrated and described is the best embodiment of my invention now known to me, but I desire it understood that in practice such modifications in the form, construction and relative arrangement of the parts may be made as clearly fall within the scope of my invention as claimed.

Having described my invention, what I claim and desire to secure by Letters Patent, is:

1. An air ship comprising a gas bag provided with a central longitudinal passage and an opening extending radially from said passage to the periphery of said gas bag running from end to end thereof, a propeller shaft mounted in said passage, and means for uniting the contiguous walls of said opening.

2. An air ship comprising a gas bag provided with a central longitudinal passage and an opening extending radially from said passage to the periphery of said gas bag running from end to end thereof, bearings located in said passage, a propeller shaft mounted in said bearings and extending through said passage, and means for uniting the contiguous walls of said opening.

3. An air ship comprising a gas bag provided with a central longitudinal passage and an opening extending radially from said passage to the periphery of said gas bag running from end to end thereof, a propeller shaft extending through said passage, a car suspended from said shaft, and means for uniting the contiguous walls of said opening.

4. An air ship comprising a gas bag provided with a central longitudinal passage and an opening extending radially from said passage to the periphery of said gas bag running from end to end thereof, securing devices attached to the contiguous walls of said opening by means of which said walls may be united, and a propeller shaft mounted in said passage.

5. An air ship comprising a gas bag provided with a central longitudinal passage and an opening extending radially from said passage to the periphery of said gas bag running from end to end thereof, lacing studs secured to the contiguous walls of said opening, laces uniting said studs, and a propeller shaft mounted in said passage.

6. An air ship comprising a gas bag provided with a central longitudinal passage and an opening extending radially from said passage to the periphery of said gas bag running from end to end thereof, a propeller shaft mounted in said passage, means for uniting the contiguous walls of said opening, and an air chamber formed in said gas bag and isolated from the gas containing portion thereof.

7. An air ship comprising a gas bag provided with a central longitudinal passage and an opening extending radially from said passage to the periphery of said gas bag running from end to end thereof, a propeller shaft mounted in said passage, hangers depending from said shaft and extending through said opening, a car supported by said hangers, and means for uniting the contiguous walls of said opening.

8. An air ship comprising a gas bag provided with a central longitudinal passage and an opening extending radially from said passage to the periphery of said gas bag running from end to end thereof, a propeller shaft mounted in said passage, hangers depending from said shaft and extending through said opening, a car supported by said hangers, means for uniting the contiguous walls of said opening, a motor on said car for operating said propeller shaft, and a second propeller shaft projecting from said car and operated by said motor.

9. An air ship comprising a gas bag provided with a central longitudinal passage and an opening extending radially from said passage to the periphery of said gas bag running from end to end thereof, a propeller shaft mounted in said passage, means for uniting the contiguous walls of said opening, a rudder, and means for supporting the same in operative position.

10. In an air ship a gas bag having a central longitudinally extended passage way and an opening extending radially therefrom, and means to unite the contiguous walls of said opening.

11. An air ship comprising a gas bag or holder having a longitudinal passage isolated from its gas-containing interior, and also having an opening at its underside in communication with said passage, and means for closing said opening, a shaft journaled in a bearing in the passage and extending beyond one end of the gas bag or holder, a propeller fixed on the extended portion of the shaft, hangers connected to the shaft and extending through tubular openings in said gas bag or holder, a car connected to the hangers, a motor in the car, and a driving connection intermediate the motor and the shaft, extending through the remaining tube.

In testimony whereof I affix my signature in presence of two witnesses.

WILLIAM C. DUNN.

Witnesses:
  KARL F. MURDOCK,
  W. H. FISK.